United States Patent Office 2,792,314
Patented May 14, 1957

2,792,314

NITROCELLULOSE EMULSIONS

Werner C. Brown, Deerhurst, Del., assignor to Hercules Powder Company, Wilmington, Del., a corporation of Delaware No Drawing. Application August 3, 1951,
Serial No. 240,279

8 Claims. (Cl. 106—170)

The invention relates to a method for producing an improved nitrocellulose emulsion and to the emulsion thus produced. In a specific aspect this invention relates to a method for improving the properties of nitrocellulose emulsions by incorporating novel surface-active agents in said emulsions and to the emulsions thus produced.

In recent years nitrocellulose lacquer emulsions have been found to be useful as coating compositions for porous materials such as paper, leather, fabrics, and the like, where the high solids content and nonpenetration features of the emulsion are desirable. However, in other fields where coating compositions are rather extensively used, the use of nitrocellulose lacquer emulsions has been quite limited. For example, nitrocellulose emulsions are not extensively used as furniture finishes primarily because of the poor water resistance and the low gloss characteristics of the emulsions. Also, the use of these emulsions as metal finishes has been somewhat restricted because of the poor gloss and unsatisfactory drying characteristics of the emulsions.

Heretofore nitrocellulose lacquer emulsions have been prepared by mixing a high-solids lacquer with a water solution or suspension of an emulsifying agent using various proportions of lacquer to water solution or suspension. Lacquer-in-water emulsions have been prepared most easily by adding the lacquer to the water solution or suspension of the emulsifying agent or agents while the latter phase is being agitated. Subsequently the resulting "coarse" emulsion was further refined in a colloiding or homogenizing operation to improve the stability of the emulsion.

Certain combinations of emulsifying agents and protective colloids or emulsion stabilizers have been found rather effective in nitrocellulose lacquer emulsions, but these combinations still have undesirable shortcomings. Probably foremost among these undesirable features is the inability of the emulsifier system to become an integral part of the emulsion film after application to the porous material. This disadvantageous feature often results in poor gloss and low water resistance of the emulsion film. Other undesirable features of these nitrocellulose lacquer emulsions are difficulty of emulsification and poor emulsion stability, particularly of pigmented emulsions.

It is an object of this invention to provide a method for producing improved nitrocellulose emulsions.

It is another object of this invention to provide a method for producing nitrocellulose emulsions of improved smoothness, clarity and water resistance.

It is another object of this invention to provide a method for producing nitrocellulose emulsions wherein only simple mixing and stirring methods are required to produce a stable emulsion.

It is another object of this invention to provide novel nitrocellulose emulsions.

It is a further object of this invention to provide novel nitrocellulose emulsions of improved physical properties.

Further and additional objects of this invention will be apparent from the disclosure hereinbelow.

The above objects and other beneficial advantages of this invention are accomplished by incorporating in the nitrocellulose emulsion a nonionic addition product of an alkylene oxide.

The following examples are illustrative of practical embodiments of this invention. In each of these examples a nitrocellulose lacquer having the following composition, shown as parts by weight, was employed:

| | |
|---|---:|
| RS nitrocellulose, ½ sec. | 15.0 |
| Coconut oil fatty acid modified pentaerythritol phthalate | 17.5 |
| Maleated pentaerythritol ester of rosin | 11.5 |
| Dibutyl phthalate | 6.0 |
| Butanol | 8.1 |
| Amyl acetate | 14.8 |
| Methyl isobutyl ketone | 12.0 |
| Xylene | 3.4 |
| Toluene | 11.7 |
| | 100.0 |
| Percent solids | 50.0 |

In each of these examples the water phase for emulsifying the above lacquer had the following composition in parts by weight:

| | |
|---|---:|
| Distilled water | 89.5 |
| Acetone | 10.0 |
| Dioctyl sodium sulfosuccinate | 0.5 |
| | 100.0 |

Also in each of the examples 2.5 parts by weight of lacquer composition were employed per part of water phase.

Example 1

To the above lacquer phase was added the adduct formed by the interaction of an alkylated phenol and ethylene oxide (Synthetics B79, a 10-mole ethylene oxide-nonylphenol adduct, by Hercules Powder Company) in an amount sufficient to produce a final emulsion wherein the adduct represented 4.0% of the total solids content. The lacquer composition was added slowly to the water phase (in an Eppenbach Homomixer), and the resulting emulsion was not further colloided or homogenized. Shelf stability was determined by storing the emulsion in glass bottles, and the emulsion was regarded as failed when sufficient phase separation occurred to prevent spray application. This emulsion had a shelf stability of 43 days. Two coats of unthinned emulsion were sprayed onto 3-ply maple plywood panels, and the emulsion had a clear, blush-free drying time of 11 minutes. The blush-free time is the time required for the emulsion to break and for the lacquer particles to flow together completely upon application of the emulsion; the white appearance (blush) of the unbroken emulsion is no longer observable after this time. The smoothness of the film was good (the unemulsified lacquer also rated good); the water spot resistance of the film was good (the unemulsified lacquer also rated good); and the polished film had an excellent gloss (the unemulsified lacquer rated only fair).

Example 2

An emulsion similar to that of Example 1 was prepared, but the adduct employed was formed by the interaction of dehydrogenated rosin and ethylene oxide. The resulting emulsion had a shelf stability of 285 days, a good water spot resistance, and a fair gloss of the polished film.

*Example 3*

An emulsion similar to that of Example 2 was prepared, but, after mixing the aqueous and lacquer phases, the resulting emulsion was further colloided by passage through a colloid mill, one pass at the 2-mil setting and two passes at the 1-mil setting. The emulsion thus produced had a shelf stability of 160 days.

*Example 4*

An emulsion similar to that of Example 1 was prepared with a polyglycol ether derivative of the monolauric ester of sorbitan (Tween 20 by Atlas Powder Co.) as the surface-active agent, and agitation was provided by a high-speed air stirrer. The resulting emulsion had a shelf stability of 38 days, a clear, blush-free drying time of 7 minutes, a fair film smoothness, and a good gloss of the polished film.

*Example 5*

An emulsion similar to that of Example 4 was prepared, but, after mixing the aqueous and lacquer phases, the resulting emulsion was further colloided by passage through a colloid mill, one pass at the 2-mil setting and two passes at the 1-mil setting. The resulting emulsion had a shelf stability of 58 days, a clear, blush-free drying time of 17 minutes, a fair film smoothness, and a good gloss of the polished film.

*Example 6*

An emulsion similar to that of Example 1 was prepared with a polyglycol ether derivative of the monostearic ester of sorbitan (Tween 60 by Atlas Powder Co.) as the surface-active agent. The resulting emulsion had a shelf stability of 64 days, a clear, blush-free drying time of 9 minutes, a good film smoothness, a good water spot resistance, and a good glass of the polished film.

*Example 7*

An emulsion similar to that of Example 6 was prepared, but the emulsion was further colloided as in Example 3. The resulting emulsion had a shelf stability of 90 days, a clear, blush-free drying time of 20 minutes, a fair film smoothness, and a fair gloss of the polished film.

*Example 8*

An emulsion similar to that of Example 1 was prepared with a polyalcohol ether of an alkylated phenol (Triton X–100 by Rohm and Haas Co.) as the surface-active agent. The resulting emulsion had a shelf stability of 285 days, a clear, blush-free drying time of 20 minutes, a good film smoothness, a good water spot resistance, and a good gloss of the polished film.

*Example 9*

An emulsion similar to that of Example 8 was prepared, but the emulsion was further colloided as in Example 3. The resulting emulsion had a shelf stability of 68 days, a clear, blush-free drying time of 30 minutes, a fair film smoothness, and a good gloss of the polished film.

*Example 10*

An emulsion similar to that of Example 1 was prepared with a polyalcohol ether of an alkylated phenol (Triton X–45 by Rohm and Haas Co.) as the surface-active agent in an amount sufficient to produce a final emulsion wherein the surface-active agent represented 7.6% of the total solids content. The resulting emulsion had a shelf stability of 291 days, a clear, blush-free drying time of 40 minutes, a good water spot resistance, and a fair gloss of the polished film.

The surface-active agents or wetting agents within the scope of this invention are of the water-soluble, nonionic type having hydrophilic groups which do not ionize. This property suggests an improvement over the cationic and anionic types of surface-active agents for use in lacquer emulsions since these latter types of surface-active agents are frequently unstable in the presence of inorganic pigments or other electrolytes which are present in the lacquer emulsion, either as necessary components or as impurities. Typical nonionic surface-active agents are condensates or addition products (adducts) of an alkylene oxide such as ethylene oxide, propylene oxide, butylene oxide, and the like. Ethylene oxide is the preferred alkylene oxide, and it will be employed in describing the details of the invention, but it will be understood that other similar alkylene oxides can be used in a similar capacity. To form the nonionic surface-active agent, the alkylene oxide, preferably ethylene oxide, is condensed with an organic compound containing a reactive hydrogen atom, for example, carboxylic acids, alcohols, phenols, amines, amides, and the like. Typical compounds are dehydrogenated rosin, alkylated phenols, mixtures of rosin and fatty acids, sorbitan monolaurate, and sorbitan monostearate. In forming the condensates or adducts the alkylene oxide and organic compound containing a reactive hydrogen atom are interacted, preferably in the presence of an alkaline catalyst, and condensed in varying molar proportions by replacement of reactive hydrogen by alkylene oxide. For example, a typical adduct can be produced by condensing 15 moles of ethylene oxide with dehydrogenated rosin. The resulting product is a mixture of adducts containing varying proportions of ethylene oxide and dehydrogenated rosin as well as polymerized ethylene oxide, and this product mixture can be used as the nonionic surface-active agent in this invention. In the same manner 10 moles of ethylene oxide can be condensed with one mole of dehydrogenated rosin to produce a mixture of adducts containing ethylene oxide and dehydrogenated rosin in varying molar proportions as well as condensed ethylene oxide. This product can similarly be used in practicing this invention. In the same manner varying molar proportions of alkylene oxide and organic compounds containing a reactive hydrogen atom can be used to form nonionic addition products which are effective surface-active agents within the scope of this invention.

The amount of adduct that is required in practicing this invention is variable and dependent upon such factors as the composition of the lacquer solution, the actual adduct or nonionic surface-active agent employed, and the like. In general, the amount will be such that the nonionic surface-active agent will represent from 4.0 to 7.0% of the total solids content of the final emulsion.

The nonionic surface-active agents discussed above can be used as the sole emulsifier for preparing nitrocellulose lacquer emulsions. However, it has been found that improved results can be obtained when these nonionic surface-active agents are employed in conjunction with more active ionizable emulsifiers. These ionizable emulsifiers can be of the cationic or anionic type. The preferred coemulsifier is dioctyl sodium sulfosuccinate, but other coemulsifiers can be used. For example, fatty alcohol sulfonates and their salts (fatty alcohol sulfates), an alkali metal salt of an alkyl-substituted naphthalene sulfonate, and the like can be used as a coemulsifier. The amount of ionizable coemulsifier that is used is variable and in general within the range of 0.5% to 1.0% by weight of the water phase employed.

As a result of the use of these coemulsifiers with the nonionic surface-active agents discussed above, smooth and substantially stable emulsions can be made when using only simple high-speed stirring to intermix the lacquer and aqueous phases, and the films resulting from the application of these emulsions show markedly improved properties.

Generally speaking the nitrocellulose emulsions of this invention comprise nitrocellulose in solution in a substantially water-immiscible solvent or solvent mixture. The emulsions may also contain suitable pigments, for example, carbon black and the like, for producing the desired color in the emulsions. The emulsions are generally of the oil-in-water type, and the nitrocellulose solution employed in producing the emulsion may contain such other ingredients as may be necessary for the production of, for example, a coating composition.

Emulsions in accordance with this invention include solutions of nitrocellulose having a concentration of nitrocellulose within the range of 10 to 40%. The ratio of nitrocellulose solution to water in the ultimate emulsion is desirably within the range of 2:1 to 3:1 by weight. In the preparation of the emulsion any desired type of nitrocellulose can be used, and the particular type of nitrocellulose that is used will depend upon the ultimate use of the emulsion. In general nitrocelluloses of the type heretofore used in lacquer emulsions can be used to produce the emulsions within the scope of this invention. The nitrocellulose can have a wide range of viscosity depending upon the ultimate use of the emulsion. For example, the nitrocellulose can have a viscosity on the basis of Hercules seconds of ¼ to ½ second or lower. On the other hand, the nitrocellulose can have a relatively high viscosity, for example, 15 to 20 seconds or higher.

Any desired solvent or solvent mixture for the nitrocellulose can be used. For example, the solvent may comprise hexyl acetate, butyl acetate, octyl acetate, amyl propionate, amyl butyrate, butyl butyrate, butyl propionate, amyl acetate, or mixtures thereof. If desired, various cosolvents, for example, butyl alcohol, amyl alcohol, and the like, can be employed in a solvent mixture. Also, diluents can be used with the solvent or solvent mixture, for example, toluene, xylene, certain aliphatic hydrocarbons, and the like, or mixtures thereof. The particular solvent or solvent mixture including a diluent or diluents which can be used in the case of any given emulsion will be dictated by the ultimate use for which the emulsion is intended, the type of surface to which it is to be applied, the conditions under which it is to be dried, etc. The nitrocellulose solution can contain various ingredients adapting it for the formation of, for example, a film or coating having desired characteristics. Thus, the nitrocellulose solution can contain various ingredients generally used in the formation of lacquers or lacquer enamels such as plasticizers, for example, triphenyl phosphate, tricresyl phosphate, etc., or mixtures thereof. The usual gums and resins such as ester gum, dammar gum, alkyd resins, particularly the glycerol phthalate type, rosin maleate resins, and the like, can also be included. Where a plasticizer and/or a gum or resin is included in the nitrocellulose solution, it can be included in any desired proportion depending upon the desired characteristics for the film or coating to be produced from the emulsion.

The above examples demonstrate the desirability of using a variety of nonionic surface-active agents in nitrocellulose lacquer emulsions. In each of these examples a 50% solids lacquer was used producing a 35.7% solids emulsion which in all cases was sprayed without thinning. Some of these emulsions could be sprayed more readily when thinned with 10 to 15% water, but the resulting films were found to have about the same properties as the films produced with the unthinned emulsions. Thinning the emulsion with water resulted in the production of an emulsion of considerably improved stability.

It was found that the film properties of emulsions containing nonionic surface-active agents and 0.5% dioctyl sodium sulfosuccinate were improved considerably over the film properties of emulsions containing a similar amount of sodium dioctyl sulfosuccinate and 0.2% carboxymethylcellulose having an 0.70 degree of substitution as an emulsion stabilizer. This latter type of emulsifier system has been found to be quite acceptable for emulsifying nitrocellulose lacquer solutions having a relatively low solids content. The property of lacquer particles, which represent the dispersed phase of a lacquer emulsion, to coalesce and form smooth continuous films when the water or continuous phase has evaporated, is largely dependent upon the viscosity of the lacquer particles or the viscosity of the lacquer solution. Thus, in lacquer emulsions of low solids content the maximum percent solids that can easily be laid down upon a surface to be coated is quite limited. The incorporation of the nonionic surface-active agents of this invention into a high solids lacquer improves the ability of the high viscosity particles to coalesce. Also, much shorter times are required for the emulsions to clear or rid themselves of water after application to a surface to be coated. Further, improved smoothness, clarity and gloss of the applied films has been noted.

The most effective anionic and cationic emulsifiers presently used in nitrocellulose lacquer emulsions are incompatible with the lacquer solids. Since these emulsifiers are water-soluble, they are subject to leaching out when films in which they are dispersed are exposed to water. Consequently, these films have poor water resistance. To minimize the effect of such leaching out, these emulsifiers are generally used in small concentrations, but the low concentration requirement limits the effectiveness of the emulsifier. Also, as a result of the use of limited concentrations of emulsifier, emulsification of the lacquer and aqueous phases is difficult, and the resulting emulsion has an undesirably low stability. The incorporation of nonionic surface-active agents improves the water resistance of emulsion films which contain even more than the minimum amount of an ionizable water-soluble emulsifying agent. A possible explanation of this apparent synergistic effect is that the nonionic agents which are less water-soluble and more oil-soluble than the ionic emulsifying agents aid in solubilizing the ionic emulsifying agent in the lacquer solids.

The stability of emulsions is considered to be a function of the efficiency of the emulsifying equipment employed as well as the effectiveness of the emulsifying agents in producing consistently small particles. The cost of colloiding or homogenizing equipment that is required for making stable emulsions as well as the cost of the colloiding operations generally detracts from the advantages of emulsions. The lacquer emulsions within the scope of this invention and containing nonionic surface-active agents are more easily emulsified than emulsions of the same composition but containing no nonionic surface-active agent. In particular, it was found that stable emulsions containing the nonionic surface-active agents described above could be produced when employing an air stirrer or other simple agitating means to intermix the lacquer and aqueous phases. No colloiding or homogenizing equipment was required for the production of stable emulsions. However, heretofore such equipment was necesssary for the production of stable emulsions when either cationic or anionic emulsifiers were employed without any nonionic surface-active agents. Furthermore, the films resulting from the emulsions within the scope of this invention in general have properties equivalent to those that are produced by passage of the same emulsion through a colloiding or homogenizing mill. Evidence that these nonionic emulsifiers improve ease of emulsification is shown by the fact that lower solids emulsions than those evaluated in the above examples are much less stable and produce films of inferior properties when prepared in a similar manner and using emulsifying systems containing anionic or cationic emulsifying agents.

Numerous modifications within the scope of this invention will be apparent from the above detailed disclosure.

What I claim and desire to protect by Letters Patent is:

1. An aqueous nitrocellulose emulsion comprising a solution of nitrocellulose in a water-immiscible, organic solvent, water and from 4 to 7.6% based on total solids of a nonionic water-soluble hydrophilic surface-active addition product of ethylene oxide.

2. An aqueous nitrocellulose emulsion comprising a solution of nitrocellulose in a water-immiscible, organic solvent and containing from 4 to 7.6% based on total solids of a nonionic water-soluble hydrophilic surface-active addiiton product of ethylene oxide and water containing from 0.5 to 1% of an anionic surface-active agent.

3. An emulsion according to claim 2 wherein a nonionic addition product of ethylene oxide and dehydrogenated rosin is employed.

4. An emulsion according to claim 2 wherein a nonionic addition product of ethylene oxide and an alkylated phenol is employed.

5. An emulsion according to claim 2 wherein the nonionic addition product is a polyglycol ether derivative of the monolauric ester of sorbitan.

6. An emulsion according to claim 2 wherein the nonionic addition product is a polyglycol ether derivative of the monostearic ester of sorbitan.

7. An emulsion according to claim 2 wherein the nonionic addition product is a polyalcohol ether of an alkylated phenol.

8. An emulsion according to claim 2 wherein the anionic surface-active agent is dioctyl sodium sulfosuccinate.

References Cited in the file of this patent

UNITED STATES PATENTS

| | | |
|---|---|---|
| 2,190,705 | Dreyling | Feb. 20, 1940 |
| 2,321,270 | Bacon et al. | June 8, 1943 |
| 2,382,533 | Auer | Aug. 14, 1945 |

FOREIGN PATENTS

| | | |
|---|---|---|
| 434,424 | Great Britain | Aug. 27, 1935 |

OTHER REFERENCES

Atlas: "Surface Active Agents," Atlas Powder Co., Wilmington 99, Del. (1948), pp. 20–22, 25 and 26, table #1 between pp. 26 and 27, and 60.

Lacquer Emulsions, Hercules Powder Co., Wilmington, Del. (1945), p. 5.